United States Patent [19]

Nishikata

[11] Patent Number: 4,550,507
[45] Date of Patent: Nov. 5, 1985

[54] THREAD CONSTRUCTION IN LENGTH MEASURING INSTRUMENT AND METHOD FOR MANUFACTURING THREAD CONSTRUCTION

[75] Inventor: Goro Nishikata, Kawasaki, Japan

[73] Assignee: Mitutoyo Mfg. Co., Ltd., Tokyo, Japan

[21] Appl. No.: 554,412

[22] Filed: Nov. 22, 1983

[30] Foreign Application Priority Data

Dec. 15, 1982 [JP] Japan .................. 57-221035
Dec. 15, 1982 [JP] Japan .................. 57-221036

[51] Int. Cl.$^4$ .............................................. G01B 3/18
[52] U.S. Cl. .................................................. 33/164 R
[58] Field of Search .................... 33/163, 164 R, 170, 33/171; 411/411, 417, 436, 437, 260; 74/424.8 R

[56] References Cited

U.S. PATENT DOCUMENTS

1,157,615 10/1915 Carlson .......................... 411/437
1,267,075 5/1918 Hubbell .......................... 33/164 R
2,932,898 4/1960 Enders ........................... 33/164 R

FOREIGN PATENT DOCUMENTS

0019604 7/1982 Japan .

OTHER PUBLICATIONS

American Machinist/Metal Working Mfg., "Ceramic Gases & Fixtures" by LeGrand, 1/21/63.

Primary Examiner—Harry N. Haroian
Attorney, Agent, or Firm—Flynn, Thiel, Boutell & Tanis

[57] ABSTRACT

A thread construction of a length measuring instrument wherein a spindle is provided by forming out of a ceramic material an externally threaded portion on the outer peripheral surface thereof. A plurality of externally threaded pieces are cut from an externally threaded member made of a material identical with and having a pitch equal to the externally threaded portion of the spindle and fixedly secured to the inner peripheral surface of a sleeve opposed to the externally threaded portion to thereby make the spindle be of a screw feed type, and the manufacturing method therefor.

10 Claims, 3 Drawing Figures

THREAD CONSTRUCTION IN LENGTH MEASURING INSTRUMENT AND METHOD FOR MANUFACTURING THREAD CONSTRUCTION

BACKGROUND OF THE INVENTION

1. Field of the Invention

This invention relates to thread construction used in a length measuring instrument such as a micrometer and a method of manufacturing the thread construction.

2. Description of the Prior Art

In the length measuring instruments and the like, there are adopted a number of highly accurate thread constructions. The reason why so many highly accurate thread constructions are used is that, when used in a driving portion of a micrometer for example, the highly accurate thread constructions are not only effective in securing the measuring accuracy but also convenient in obtaining a given measuring force. In short, the positional relationship between two articles operationally associated with each other can be fixed at a desirable position. On the other hand, however, the thread constructions, being subjected to the measuring force, are, so to say, the most easily worn portions. In consequence, necessity is voiced for the increased wear resistance with the initial accuracy being secured.

Recently, there has been proposed the utilization of ceramics material in the measuring instruments as viewed from the advantages thereof in wear resistance, light weight, low thermal expansion, electrical insulation and the like. However, no ceramic material has been used in the length measuring instruments such as a micrometer. This is because it is very difficult to obtain from the ceramic material the highly accurate thread construction which satisfies requirements of workability and economics. The reason is that, in the case of ceramic material, the conventional processes of working upon metals are not good on the ceramic materials as viewed from the high mechanical strength thereof. In consequence, in the case of ceramic material, the working should be reliably done by grinding as viewed from the question of accuracy. However, in that case, at present, there does not exist a grinding machine capable of grinding internal threads having a small diameter, e.g., a diameter of 12 mm or less, so that the thread construction, i.e., the thread construction of external threads and internal threads mating with each other cannot be obtained from the same material. On the other hand, if the thread construction has a large diameter, then the measuring instrument will have decreased practical values from the viewpoint of accuracy, economics and operation because of the characteristics of the measuring instrument.

In consequence, as an example of the adoption of the ceramic material in the measuring instrument, it has heretofore been limited to the construction of the main and auxiliary scales which are slidable on each other as seen in the measuring instrument disclosed in Japanese Patent Kokai (Laid-Open) No. 19604/82 for example, and moreover, such a problem is developed that a separate means should be added thereto to secure a predetermined measuring force, thus resulting in lowered practical value.

SUMMARY OF THE INVENTION

A first object of the present invention is to provide a thread construction of a length measuring instrument wherein a screw feed portion such as a spindle is made of a ceramic material.

To this end, the present invention contemplates that, in a length measuring instrument wherein a frame body includes an anvil and a spindle linearly movable to and from the anvil and the spindle is of a screw feed type, an externally threaded portion is provided on the spindle and is made of a ceramic material and that an internally threaded portion is provided on the frame body and is threadably coupled to the externally threaded portion defined by a plurality of externally thread pieces cut out of an externally threaded member having a pitch equal to the aforesaid externally threaded portion and secured to an inner peripheral surface of said frame body at arcuately spaced intervals and where the externally threaded portion is positioned.

A second object of the present invention is to provide a method of manufacturing a thread construction made of a ceramic material for use in the length measuring instrument.

To this end, the present invention contemplates that an externally threaded portion of a spindle made of a ceramic material is formed, an externally threaded member made of a ceramic material and having a pitch equal to the externally threaded portion is formed, the externally threaded member is cut in the axial direction thereof to thereby form a plurality of externally threaded pieces, subsequently, the externally threaded pieces are affixed to the inner peripheral surface of a frame body in a length measuring instrument where the externally threaded portion of the spindle is positioned, with the threaded portion directed radially inwardly to thereby form an internally threaded portion, and the internally threaded portion is threadably coupled to the externally threaded portion, whereby the set of threaded portions in the length measuring instrument having a compartively small diameter can be made of ceramic material.

DETAILED DESCRIPTION OF THE PREFERRED EMBODIMENT

Figure 1:
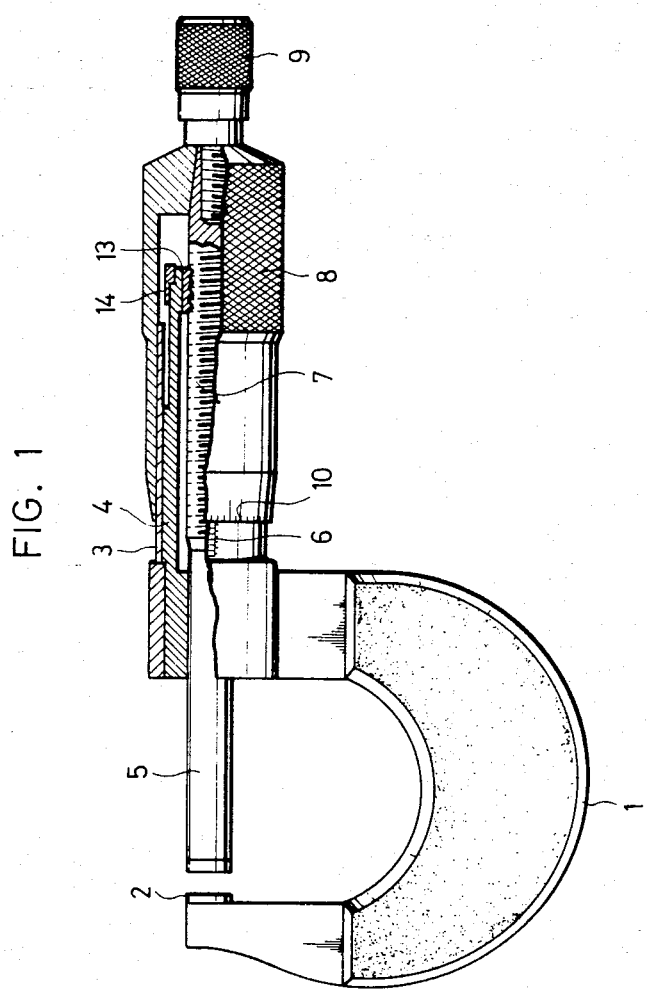
FIG. 1 is a front view, partially cut away, showing an embodiment of the present invention.

FIG. 1 shows a micrometer to which is applied the thread construction according to the present invention. Referring to the drawing, an anvil 2 made of a ceramic material is affixed to an inner surface of one end portion opposed to the other portion of a frame body 1 formed into a U-shape. Furthermore, a cylindrical outer sleeve 3 is integrally affixed at an inner end thereof to an outer surface of the other end portion of the frame body 1 and a spindle 5 made of a ceramic material is inserted through the outer sleeve 3 by way of a cylindrical inner sleeve 4 in a manner to be linearly movable with respect to the anvil 2. A graduation 6 having a pitch of 0.5 mm is formed on the outer peripheral surface of the outer sleeve 3 along the axial direction thereof.

An externally threaded portion 7 having a pitch of 0.5 mm is formed on the spindle 5 over a range from the substantially central portion to a position close to the outer end portion of the spindle 5, and a thimble 8 slidably coupled to the outer surface of the outer sleeve 3 and integrally rotatable with the spindle 5 and a control knob 9 are secured to the outer end portion of the spindle 5, respectively. Formed on the outer peripheral surface of the inner end portion of the thimble 8 is a graduation 10 having a pitch obtained by dividing the outer periphery of the thimble 8 into 50 equal sections. Furthermore, the control knob 9 is provided therein with a ratchet mechanism, so that the spindle 5 can be idlingly rotatable with respect to the thimble 8 and the spindle 5 when a measuring force above a predetermined value of pressure is applied to the spindle 5.

Figure 2:
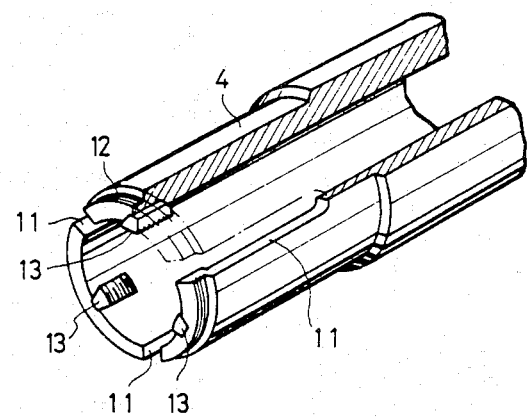
FIG. 2 is a perspective view enlargedly showing the essential portions thereof.

As shown in FIG. 2, the inner sleeve 4 is formed at the end portion thereof affixed to the frame body 1. That is, the outer end portion thereof has three slit grooves therein extending in the axial direction of the inner sleeve 4 and are arcuated spaced at intervals of 120° in the circumferential direction. There are respectively provided a threaded portion 12 on the outer peripheral portion of the inner sleeve 4. Three externally threaded pieces 13 are threadably coupled to the externally threaded portion 7 of the spindle 5 at arcuately spaced intervals of 120° relative to the inner peripheral surface of the outer end portion of the inner sleeve 4. The threaded pieces 13 are made of a ceramic material. Threadably coupled to the sleeve 4 is a tapered nut 14 for effecting an expanding or reducing of the inner diameter of the outer end portion of the inner sleeve 4 in the radial direction, whereby a clearance formed between the externally threaded portion 7 of the spindle 5 and the externally threaded pieces 13 is rendered adjustable.

Figure 3:
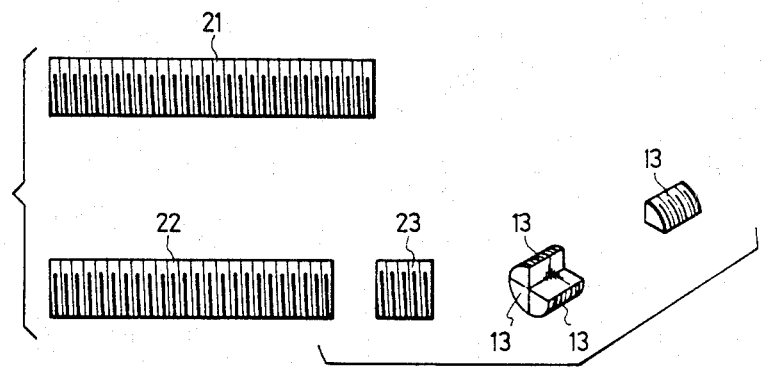
FIG. 3 is an explanatory view showing a process of manufacturing externally threaded pieces.

The following description briefly sets forth a method of manufacturing the externally threaded pieces 13. For this purpose, as shown in FIG. 3, an externally threaded shaft 21 made of a ceramic material and having a pitch equal to that of the externally threaded portion 7 is cut to a given length to thereby form two externally threaded members 22 and 23. One of the members one 23 of is cut in the axial direction, whereby there becomes a plurality of circumferentially divided externally threaded pieces 13. To secure these externally threaded pieces 13 to the inner sleeve 4 to make them internally an threaded member, the externally threaded pieces 13 are fixedly secured, as by bonding, to the inner sleeve 4 with the threaded portions directed inwardly, whereby the internally threaded portions of each piece 13 made of a ceramic material, is threadably coupled to the externally threaded portion 7.

In addition, the other member 22 of the externally threaded members can be utilized as the externally threaded portion 7. In this case, stems each having a given length are connected to the opposite ends of the externally threaded member 22 to thereby form a spindle 5, or the externally threaded shaft 21 may be previously formed into a form of the spindle 5 during manufacture.

The micrometer thus constructed is operated in a manner similar to that of the conventional micrometer. In short, rotation of the thimble 8 causes the spindle 5 to linearly move to and from the anvil 2 in accordance with the pitch of the externally threaded portion 7 and the externally threaded pieces 13. Consequently, if a workpiece to be measured is clampedly held between the anvil 2 and the spindle 5, then it becomes possible to read from the graduations 6 and 10 a distance between the anvil 2 and the spindle 5, i.e., a dimension of the workpiece.

In consequence, according to this embodiment, the externally threaded portion 7 provided on the spindle 5 is made of a ceramic material and the internally threaded portion to be threadably coupled to the externally threaded portion 7 is constructed such that a plurality of externally threaded pieces 13, cut out of the externally threaded member 23, are made of a material identical with and having a pitch equal to the externally threaded portion 7. The pieces 13 are secured to the inner peripheral surface of the inner sleeve 4, so that such a micrometer can be provided with a screw feed portion thereof made of a ceramic material. This makes it possible to improve the wear resistance of the screw feed portion, so that the measuring accuracy of the micrometer at the initial stage can be maintained for a long period of time.

Particularly, according to this embodiment, the externally threaded member 23 made of a ceramic material is cut in the axial direction thereof to thereby form a plurality of externally threaded pieces 13 which are divided into in the circumferential direction and these externally threaded pieces 13 are secured to the inner peripheral surface of the inner sleeve 4 as being the internally threaded material, so that a small diameter internally threaded portion made of a ceramic material, which has heretofore been difficult to be manufactured, can be readily obtained. Moreover, to manufacture such a small diameter internally threaded portion, it suffices only to work on the externally threaded materials, so that the manufacture is facilitated and improvement in the aspects of accuracy and cost can be achieved.

Furthermore, three externally threaded pieces 13 are arranged on the inner peripheral surface of the inner sleeve 4, so that, as far as the pitches equal to each other are used, the manufacture of an internally threaded portion having a diameter different from the externally threaded portion 7 is facilitated, and moreover, the surface of the internally threaded portion being in contact with the externally threaded portion 7 can be reduced, thus enabling a minimizing of the sliding resistance. Further, the inner sleeve 4 may be varied in its diameter, so that a clearance between the externally threaded portion 7 and the externally threaded pieces 13 can be adjusted. In addition to the above, since a ceramic material has electric insulation characteristics, if an electric encoder is used in a detecting portion for example, then no magnetic problem is caused, with the result that detecting means of various types can be utilized, thereby improving the read-out accuracy.

Additionally, in the above embodiment, the spindle 5 as a whole is made of a ceramic material, however, only the portion of the externally threaded portion 7 made be made of a ceramic material. Furthermore, the externally threaded portion 7 and the internally threaded portion may be different in component from each other as far as the both members are made of ceramic materials. Additionally, in the above embodiment, three externally threaded pieces 13 are disposed on the inner sleeve 4 to thereby form an internally threaded portion however, the number of the externally threaded pieces 13 may be at least two. Further, in the above description, an example has been shown in which the present invention is applied to the screw feed portion of the micrometer, however, the present invention may be applied not only to the length measuring instruments such as a micrometer but also to measuring instruments of various types, machine tools and the like which have thread constructions.

As has been described hereinabove, the present invention can provide a thread construction of a length measuring instrument and a method of manufacturing the same, wherein a comparatively small portion such as a screw feed portion of a spindle can be made of a ceramic material.

The embodiments of the invention in which an exclusive property or privilege is claimed are defined as follows:

1. A thread construction of a length measuring instrument wherein a frame body comprises an anvil and a spindle linearly movable to and from said anvil and said spindle is of a screw feed type, an externally threaded portion provided on said spindle and made of a ceramic material, and an internally threaded portion provided on said frame body and coupled to said externally threaded portion and defined by a plurality of externally threaded pieces cut out of an externally threaded member made of a material identical with and having a pitch equal to said externally threaded portion, each said piece being secured to an inner peripheral surface of said frame body at arcuately spaced intervals and where said externally threaded portion is positioned.

2. A thread construction of a length measuring instrument as set forth in claim 1, wherein said inner peripheral surface of said internally threaded portion includes means for facilitating an expansion or contraction thereof in the radial direction.

3. A thread construction of a length measuring instrument as set forth in claim 2, wherein said expansion or contraction means includes a plurality of axially extending slots formed in an end of said externally threaded portion of said spindle and a tapered nut threadably coupled to said externally threaded portion.

4. A thread construction of a length measuring instrument as set forth in claim 1, wherein said externally threaded pieces are arcuately spaced at three positions in the circumferential direction on said inner peripheral surface of said internally threaded portion.

5. A thread construction of a length measuring instrument as set forth in claim 2, wherein said externally threaded pieces are arcuately spaced at three positions in the circumferential direction on said inner peripheral surface of said internally threaded portion and intermediate said slots.

6. A thread construction of a length measuring instrument, wherein said instrument comprises:
a U-shaped frame body having fixedly secured to one end thereof an anvil and affixed to the other end thereof a hollow sleeve having an internally threaded portion;
a spindle made of a ceramic material, provided in said sleeve, said spindle being linearly movable to and from said anvil and having formed on the outer peripheral surface thereof an externally threaded portion meshingly engageable with said internally threaded portion over a predetermined range; and
a thimble rotatably coupled to an outer peripheral surface of said sleeve and connected to said spindle in a manner to be integrally rotatable therewith; and
said internally threaded portion being defined by a plurality of externally threaded pieces cut out of an externally threaded member having a pitch equal to said externally threaded portion, each said piece being secured to an inner peripheral surface of said sleeve at arcuately spaced intervals and where said externally threaded portion is positioned, said sleeve having a plurality of axially extending slots formed in an end of said sleeve at said internally threaded portion thereof, said pieces being spaced at regular intervals inside sleeve adjacent said slots, and a tapered nut threadably coupled to said externally threaded portion for facilitating an expansion and contraction of said internally threaded portion.

7. A thread construction of a length measuring instrument as set forth in claim 6, wherein said slots are arcuately spaced at three positions and each of said externally threaded pieces is fixed to said inner peripheral surface intermediate said slots.

8. A thread construction of a length measuring instrument as set forth in claim 6, wherein each of said externally threaded pieces is small in length and substantially segmental in section.

9. A method of manufacturing a thread construction of a length measuring instrument wherein a frame body comprises:
an anvil;
a spindle linearly movable to and from said anvil; and
a sleeve disposed around the outer periphery of said spindle; and
forming said spindle out of a ceramic material with an outer peripheral portion thereof being formed into an externally threaded portion, forming an externally threaded member out of a ceramic material and having a pitch equal to said externally threaded portion, cutting said externally threaded member in an axial direction to form a plurality of externally threaded pieces, bonding said externally threaded pieces securely to an inner peripheral surface of said sleeve opposed to said externally threaded portion with the threaded portions of said pieces being directed inwardly to thereby form an internally threaded portion, and threadably coupling said internally threaded portion and said externally threaded portion to each other to thereby make said spindle be of a screw feed type.

10. A method of manufacturing a thread construction of a length measuring instrument as set forth in claim 9, wherein said externally threaded member is cut in a direction perpendicularly intersecting the longitudinal axis thereof to thereby form a plurality of externally threaded pieces followed by a said cutting of one of said externally threaded pieces in an axial direction.

* * * * *